J. DIDSCHUNEIT.
AUTOMOBILE FENDER.
APPLICATION FILED SEPT. 10, 1913.
1,082,415.
Patented Dec. 23, 1913.
2 SHEETS—SHEET 1.
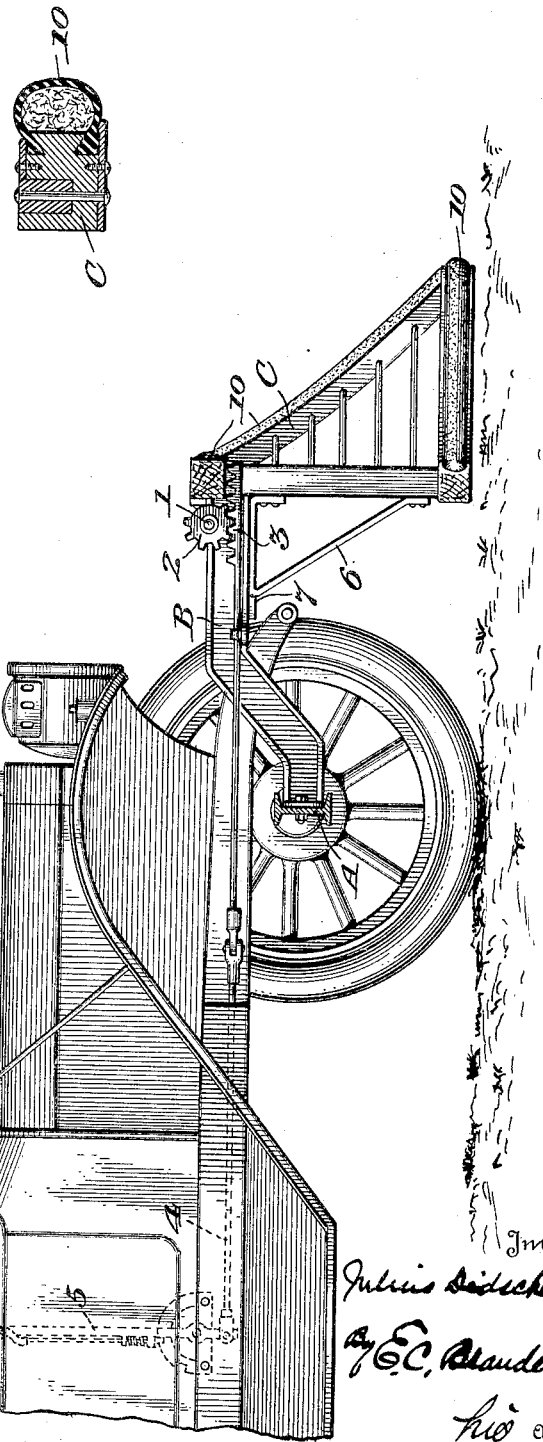

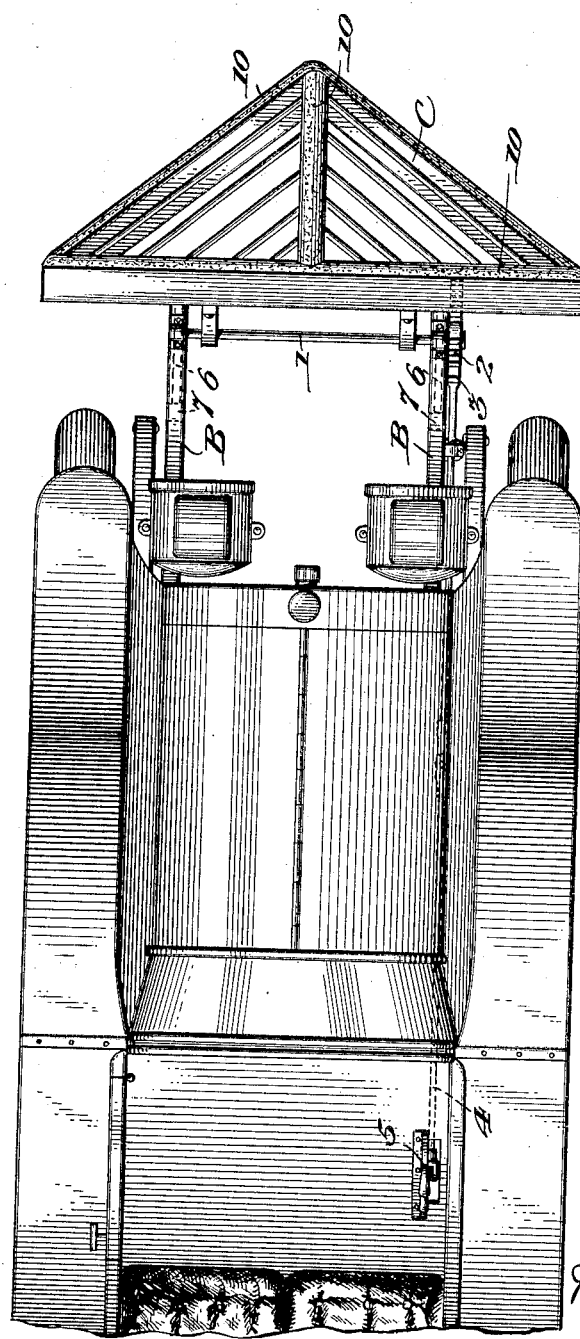

UNITED STATES PATENT OFFICE.

JULIUS DIDSCHUNEIT, OF CAMDEN, SOUTH CAROLINA, ASSIGNOR OF ONE-FOURTH TO LEGUEL A. WITTKOWSKY, OF CAMDEN, SOUTH CAROLINA.

AUTOMOBILE-FENDER.

1,082,415.      Specification of Letters Patent.      Patented Dec. 23, 1913.

Application filed September 10, 1913. Serial No. 789,053.

*To all whom it may concern:*

Be it known that I, JULIUS DIDSCHUNEIT, a citizen of the United States, residing at Camden, in the county of Kershaw and State of South Carolina, have invented certain new and useful Improvements in Automobile-Fenders, of which the following is a specification.

My invention relates to an improvement in automobile fenders, and more particularly to that type of fender which is so mounted on an automobile that it is capable of oscillation upon the operation of certain mechanism by the operator.

The invention consists in still other novel features of construction and combinations of parts which will be hereinafter described and pointed out in the claims.

In the accompanying drawings: Figure 1 is a view in side elevation with one of the wheels of the vehicle removed to show more clearly the manner of mounting the apparatus; and Fig. 2 is a top plan view. Fig. 3 is a sectional view through the fender showing the manner of applying the cushion thereto.

A represents the front axle of an automobile, to which is connected the frame B. Pivotally mounted upon the frame is a shaft 1, to which is rigidly connected a fender C of the pilot type. Mounted upon the shaft 1 is a gear wheel 2. A rack bar 3 is slidably mounted upon the frame B and the teeth of the rack bar mesh with the teeth of the gear wheel 2 for the purpose of rotating the wheel upon the actuation of the rack bar for causing an oscillation of the fender.

The rack bar is connected to a lever 5 by a link 4, the lever being pivotally mounted on the car.

Connected to the pilot C are bracket stops 6, which are adapted to come into engagement with the frame A and shoulders 7 thereon for limiting the inward movement of the fender and maintaining the fender in a vertical position. The fender C is provided on its upper surface with a rubber tubing or cushion 10, which covers the framework for the purpose of relieving the shock or bruising of the person in case of accident.

Having fully described my invention, what I claim as new and desire to secure by Letters Patent is:

1. The combination with an axle, of a frame connected thereto, a fender pivotally connected to the frame, a gear wheel connected to the fender, and a rack bar meshing with the gear wheel for the purpose of oscillating the fender.

2. The combination with an axle, of a frame connected thereto, a shaft journaled upon the frame, a fender connected to the shaft, a gear wheel mounted upon the shaft, a toothed bar meshing with the gear wheel whereby upon the actuation of the bar the fender is caused to be oscillated, and means for limiting the rearward movement of the fender.

In testimony whereof I affix my signature, in the presence of two witnesses.

JULIUS DIDSCHUNEIT.

Witnesses:
    Mrs. ROBERT LATTA,
    Mrs. F. S. WEST.

Copies of this patent may be obtained for five cents each, by addressing the "Commissioner of Patents, Washington, D. C."